(12) United States Patent
Henninger et al.

(10) Patent No.: US 8,283,488 B2
(45) Date of Patent: Oct. 9, 2012

(54) PROCESS FOR PREPARING RADIATION-CURABLE PREPOLYMERS CONTAINING URETHANE GROUPS

(75) Inventors: Björn Henninger, Köln (DE); Ursula Tracht, Leverkusen (DE); Sigurd Buchholz, Köln (DE); Claudia Willems, Leverkusen (DE); Rolf Bachmann, Bergisch Gladbach (DE); Michael Ludewig, Leverkusen (DE); Wolfgang Fischer, Meerbusch (DE)

(73) Assignee: Bayer MaterialScience AG, Leverkusen (DE)

( * ) Notice: Subject to any disclaimer, the term of this patent is extended or adjusted under 35 U.S.C. 154(b) by 482 days.

(21) Appl. No.: 12/504,790

(22) Filed: Jul. 17, 2009

(65) Prior Publication Data

US 2010/0022797 A1    Jan. 28, 2010

(30) Foreign Application Priority Data

Jul. 24, 2008 (DE) .................. 10 2008 034 473

(51) Int. Cl.
  *C07C 69/52* (2006.01)
(52) U.S. Cl. ......... 560/220; 560/221; 560/336; 560/330
(58) Field of Classification Search .................. None
  See application file for complete search history.

(56) References Cited

U.S. PATENT DOCUMENTS

| | | | |
|---|---|---|---|
| 3,640,967 A | 2/1972 | Konig et al. | |
| 3,782,961 A | 1/1974 | Takahashi et al. | |
| 4,808,961 A | 2/1989 | Sako et al. | |
| 6,569,944 B2 | 5/2003 | Weikard et al. | |
| 2003/0082370 A1 | 5/2003 | Husemann et al. | |
| 2003/0103879 A1 | 6/2003 | Jahn et al. | |
| 2005/0014907 A1* | 1/2005 | Weikard et al. ............... 525/453 |

FOREIGN PATENT DOCUMENTS

| | | |
|---|---|---|
| DE | 1570540 A1 | 3/1970 |
| DE | 1644798 A1 | 9/1970 |
| DE | 1770245 A1 | 10/1971 |
| DE | 2115373 A1 | 10/1971 |
| DE | 3717060 A1 | 12/1988 |
| DE | 10331672 A1 | 1/2005 |
| EP | 1284159 A2 | 2/2003 |
| EP | 1293547 A1 | 3/2003 |
| GB | 1159551 | 7/1969 |
| WO | 2007/090680 A1 | 8/2007 |

OTHER PUBLICATIONS

Actini: "Radiation, i.e. light (especiallly UV), in the broader sense also pertaining to ionizing radiation", Roche Lexikon Medizin, vol. A19, 4th Edition, Urban & Fischer Verlag Munchen 1999. (p. 8, line 11-13 of the specification.).
NS Allan et al. "Prepolymers & Reactive Diluents for UV & EB Curable Formulations" Chemistry & Technology of UV & EV Formucaltions for Coatings, Ink & Paints, vol. II, pp. 73-123.
NS Allan et al. "Prepolymers & Reactive Diluents for UV & EB Curable Formulations" Chemistry & Technology of UV & EV Formucaltions for Coatings, Ink & Paints, vol. II, pp. 250-290. p. 13, line 5-7 of the specification.
Phenol, Ullmanns Enzyklopädie der Technischen Chemie, 4th edn., vol. 19 (1981), p. 306.
Polyurethane, Houben-Weyl, Methoden der Organischen Chemie, vol. XIV/2, Thieme-Vergag, Stuttgart (1963) p. 57-70.

* cited by examiner

*Primary Examiner* — Yevegeny Valenrod
(74) *Attorney, Agent, or Firm* — Norris McLaughlin & Marcus PA

(57) ABSTRACT

The invention relates to a continuous process for preparing radiation-curable prepolymers containing urethane groups, more particularly urethane acrylates.

7 Claims, 3 Drawing Sheets

PROCESS FOR PREPARING RADIATION-CURABLE PREPOLYMERS CONTAINING URETHANE GROUPS

Figure 1:
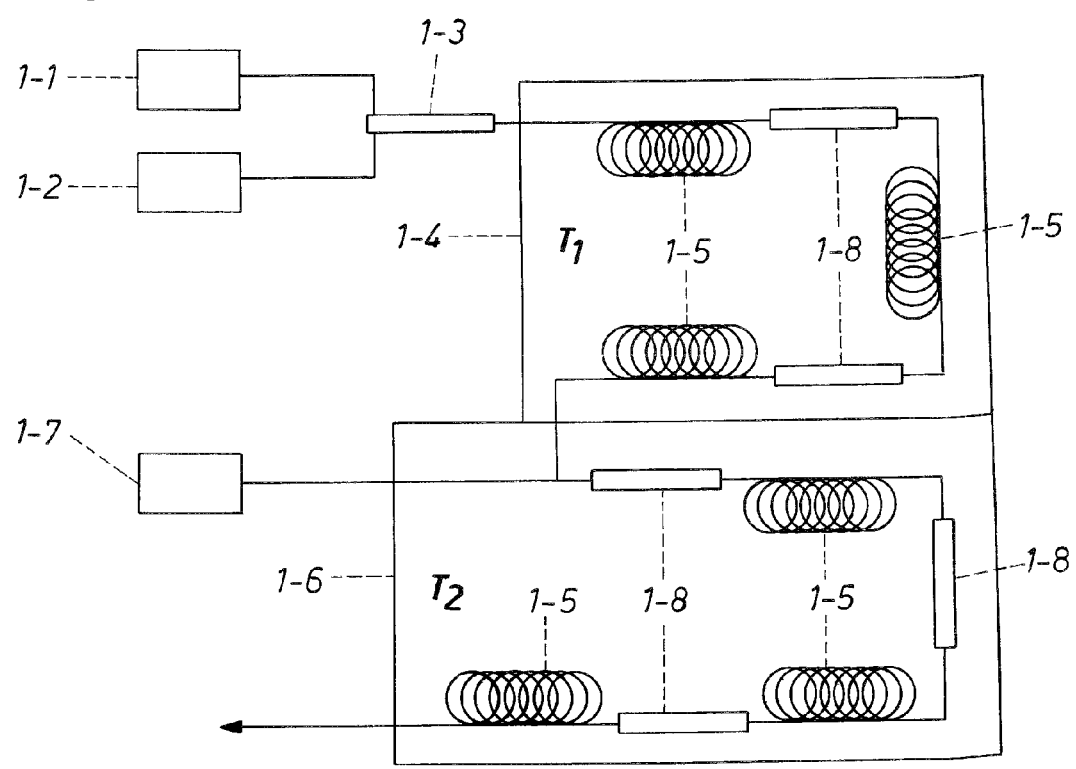

The invention relates to a process for the preparation of radiation-curable prepolymers containing urethane groups, and to the use of the products obtained by this process as materials curable free-radically with actinic radiation and/or thermally.

Radiation-curable prepolymers containing urethane groups find broad application in the art, as for example in photoresists and as components in high-grade coating materials. They have ethylenically unsaturated double bonds, which on exposure to high-energy radiation, for example UV light or electron beams, undergo polymerization and form a high molecular mass network. Coatings based on radiation-curable prepolymers containing urethane groups are notable in general for a high level of resistance to mechanical or chemical influences.

An overview of ethylenically unsaturated prepolymers containing urethane groups is found for example in P. K. T. Oldring (ed.), Chemistry and Technology of UV and EB formulations for Coatings, Inks and Paints, Vol. II, SITA Technology, London, 1991, pp. 73-123.

The radiation-curable prepolymers containing urethane groups include, above all, urethane acrylates and their diverse possibilities for use.

WO 2007090680 A1 describes urethane acrylates which are used as radiatively and/or thermally free-radically curable materials for the production of new thermoset materials, more particularly as coating materials, adhesives, sealants and precursors for films and mouldings. DE 2115373 A1 describes urethane acrylates which are used as materials for producing flexographic printing plates.

Urethane acrylates are prepared, as a function of the desired target product, in a variety of ways.

DE 1644798 A1 describes the reaction of tolylene diisocyanate with 2-hydroxyethyl acrylate for preparing a urethane acrylate. In this case the hydroxyalkyl acrylate is preferably introduced initially, in a solvent, and the isocyanate is added with stirring the addition being intended to take place at a rate such that the exothermic reaction does not exceed a temperature of about 32° C.

DE 2115373 A1 likewise describes a discontinuous synthesis for a urethane acrylate, which proceeds in two steps: in the first step, an excess of diisocyanate is reacted with a polyether polyol to give the polyurethane. In the second step, a hydroxyalkyl acrylate is added which is reacted with unreacted isocyanate groups. A description is given of how, during the reaction, unnecessarily high temperatures should be avoided, in order to prevent follow-on reactions, particularly of the unsaturated double bonds. The reaction times are correspondingly long, at several hours.

U.S. Pat. No. 6,569,944 B2 describes how the synthesis of viscose urethane acrylates is often carried out in solvents. At temperatures below 120° C., the reaction components are said to be too viscose, and at temperatures above 100 to 120° C., there is said to be a risk of compounds with acrylate groups undergoing spontaneous polymerization. A consequence of the high viscosity of reactants and products is a poor commixing. The exothermic nature of the reaction may therefore result in the incidence of what are called hotspots, leading at its most favourable to products which are non-unitary and non-reproducible, but which in the worst case may entail the runaway of the reaction in the sense of an unwanted polymerization.

Additionally it is known that prepolymers containing acrylate groups are sensitive to shear and that a spontaneous polymerization may occur as a result of mechanical loading (see, for example, EP 1 293 547 B1).

The synthesis of urethane acrylates, then, is subject to a series of requirements which run counter to rapid and uncomplicated preparation. It would be desirable to be able to carry out the synthesis of urethane acrylates at relatively high temperatures in order to shorten the reaction time. Here, however, is the risk of follow-on reactions setting in, particularly the free-radical polymerization of the unsaturated double bond of the acrylate. Moreover, a continuous procedure would be of economic advantage, in order to prevent reactor downtime as a consequence of filling and emptying operations, and to avoid long reaction times as a result of safety impositions, of reactor-specific heat exchange performance, and of heating and cooling operations.

DE 10331672 A1 describes a single-stage continuous process for preparing a urethane acrylate wherein IPDI (1-isocyanato-3-isocyanatomethyl-3,5,5-trimethylcyclohexane) is reacted with 2-hydroxypropyl acrylate in a static mixer. According to Example 4 the result was a product having a residual NCO content of 1.4%, a residual free IPDI content of 0.09% and a free 2-hydroxypropyl acrylate content of 1.7%. Throughout the course of the experiment, sharp pressure fluctuations were observed in the reactor, and did not allow a smooth continuous regime. The high residual 2-hydroxypropyl acrylate content is objectionable, having adverse effects on humans and the environment. Changing the parameters of the process, and adding variable amounts of catalyst, also did not provide any remedy, and so the conclusion was drawn that the preparation of an ethylenically unsaturated polyurethane by means of a one-stage, continuous operation was not reproducibly possible.

The industrial synthesis of urethane acrylates is frequently carried out with catalysis. The catalyst lowers the activation energy for the addition reaction of the hydroxy component with the isocyanate component, and so the reaction can be carried out at lower temperatures—and hence with greater technical reliability with regard to the possible polymerization. It is known that the reaction of diisocyanates having isocyanate groups of different reactivity, such as in IPDI, for example, with alcohols can be carried out by means of suitable catalysts such as, for example, dibutyltin dilaurate at temperatures below 100° C., preferably below 65° C., with enhanced selectivity (DE 103 31 672 A1).

It is of advantage, furthermore, if the synthesized radiation-curable prepolymers containing urethane groups possess a low viscosity. In this case they can easily be processed further and used/applied. In particular it is possible to do very largely without reactive diluents and/or solvents for dilution in the case of further processing and/or use. Where the radiation-curable prepolymers containing urethane groups are used as coating materials, the solvent must be removed; reactive diluents remain in the product. In each case the producer of coating materials is restricted in the possibilities for formulation diversity, and accordingly it would be desirable to produce products with a low viscosity at the same time as achieving consistent properties with respect to their use in coating material. This is accomplished predominantly through the use of discontinuous processes which, at the expense of long tank occupancy times, as a result of the carefully controlled, slow metering of the reactants, are carried out with strict observance of defined temperatures.

On the basis of the prior art, therefore, the object is that of providing a continuous process for preparing radiation-curable prepolymers containing urethane groups—referred to as prepolymers for short—which can be carried out both using solvents and in solvent-free form and, in addition, both catalyzed and uncatalyzed. A further object is that of providing a process for the preparation of the stated prepolymers that can be carried out economically and on the industrial scale. A further object is that of providing a process which combines the high product quality of the prepolymers prepared by discontinuous processes with the higher space/time yield of continuous processes.

The invention accordingly provides a process for the continuous preparation of radiation-curable prepolymers containing urethane groups, characterized in that at least two components are first mixed and then passed through a delay section, one of the at least two components comprising one or more compounds having at least one isocyanate group per molecule, with the other of the at least two components comprising one or more compounds having at least one isocyanate reactive group and also at least one ethylenically unsaturated double bond per molecule.

Continuous reactions in the sense of the invention are those in which the in feed of the reactants into the reactor and the discharge of the products from the reactor take place simultaneously but at separate locations, whereas, in the case of discontinuous reaction, the reaction steps of feeding the reactants, carrying out chemical reaction and discharging the products take place in temporal succession.

The components may comprise further compounds such as, for example, solvents, reactive diluents, auxiliaries and/or catalysts.

Additionally possible is the feeding of further components along the delay section. The further components may in turn, again, comprise one or more compounds having isocyanate-reactive groups and/or isocyanate groups.

Along the delay section the reaction of the isocyanate groups with the isocyanate-reactive groups takes place, to form urethane groups. In one preferred embodiment the continuous reaction takes place using at least one mixing unit and a delay section under pressure of 0-30 bar, preferably of 0-10 bar, more preferably in the range of 0-4 bar, and at temperatures of +20 to +200° C., preferably in the range from +80 to +160° C., and in particular at +90 to +120° C.

The metering rates depend primarily on the desired delay times and/or conversions rates to be achieved. The higher the maximum reaction temperature, the shorter the delay time should be. Generally speaking, the reactants in the reaction zone have delay times of between 20 seconds (20 sec) and 120 minutes (120 min), preferably between 90 sec and 90 min, very preferably between 5 min and 60 min. In this context, the reactions carried out without catalysis generally have a significantly higher delay time than the reactions carried out with catalysis. It should be noted, however, that the process of the invention can be carried out both with and without catalysis.

The delay time can be controlled, for example, through the volume flow rates and the volume of the reaction zone. The course of the reaction is advantageously monitored by means of different measuring devices. Particularly suitable for this purpose are devices for measuring the temperature, the viscosity, the thermal conductivity and/or the refractive index in flowing media and/or for measuring infrared spectra and/or near-infrared spectra.

A particular feature of the reaction sections for use in accordance with the invention is their high heat transfer performance, as characterized by the specific heat transfer rate in $W/(K \cdot m^3)$, in other words the heat transfer per kelvin of temperature difference in relation to the heat transfer medium, relative to the free volume of the reactor. Accordingly the reaction sections for use in accordance with the invention are characterized in that, by virtue of their construction, in the process of the invention they permit a) a maximum pressure loss of 0 to 30 bar, preferably 0 to 10 bar and, with particular preference, 0 to 4 bar, and b) a heat transfer rate of 20 to 750 $kW/(K \cdot m^3)$, preferably 50 to 500 $kW/(K \cdot m^3)$ and more preferably 100 to 300 $kW/(K \cdot m^3)$.

Appropriate here, for example, is the use of microreaction technology (p-reaction technology) with deployment of microreactors. The designation "microreactor" used here is representative of microstructured reactors which preferably operate continuously and are known by the designation microreactor, minireactor, microheat exchanger, minimixer or micromixer. Examples are microreactors, micro-heat exchangers, T- and Y-mixers and also micromixers from a wide variety of companies (e.g. Ehrfeld Mikrotechnik BTS GmbH, Institut für Mikrotechnik Mainz GmbH, Siemens AG, CPC-Cellulare Process Chemistry Systems GmbH, and others), as are common knowledge to a person skilled in the art; a "microreactor" for the purposes of the present invention typically has characteristic/defining internal dimensions of up to 1 mm and may include static mixing internals.

Likewise suitable are intensive heat exchangers, e.g. CSE-XR models from Fluitec, provided that they are able to fulfill the abovementioned properties in terms of their heat transfer capacities. Likewise conceivable here are coupled systems of microreactors with other heat exchangers with a relatively high degree of structuring, such as those from Fluitec or Sulzer, for example. The key feature in the case of these coupled systems is the arrangement of the individual types of reactor in accordance with the respectively anticipated, necessary thermal performance of the individual apparatus, taking account of the viscosities and/or pressure losses that occur.

As well as the heat transfer properties of the reaction section, a narrow delay time distribution in the reactor system is likewise an advantage, hence allowing the delay volume necessary for the desired conversion to be minimized. This is customarily achieved for the use of static mixing elements or of μ-reactors, as described above. Typically, as well, intensive heat exchangers such as those, for example, of the CSE-XR type adequately meet this requirement.

The components are metered into the reactor generally in separate reactant streams. Where there are more than two reactant streams, they may also be supplied in a bundled form. Components containing hydroxyl groups may be combined into one product stream. It is also possible additionally to add catalysts and/or adjuvants such as flow control agents, stabilizers or adhesion promoters to this product stream. Likewise it is possible for monoisocyanate or polyisocyanate to be reacted with a polymerizable compound having at least one free hydroxy group and one ethylenically unsaturated double bond, and to be combined with catalysts and/or adjuvants such as flow control agents, stabilizers or adhesion promoters into one reactant stream. The streams may also be divided and in that way supplied in different proportions at different locations to the reactor. In this way, concentration gradients are set purposively, and this may bring about completeness of the reaction. The entry point of the streams may be varied in sequence and offset in time. For the purpose of preliminary reaction and/or completion of the reaction, it is also possible for two or more reactors to be combined. Towards the end of the reaction section it is possible, optionally, for further desired additives that are customary in coating technology to be supplied and mixed in. Preferably, however, the additives are added to a reaction component even before the actual reaction. Such additives are photoinitiators, inhibitors, light stabilizers such as UV absorbers and sterically hindered amines (HALS), and also antioxidants, fillers, and paint auxiliaries, e.g. anti-settling agents, deaerating agents and/or wetting agents, flow control agents, reactive diluents, plasticizers, catalysts, and also pigments, dyes and/or matting agents. The use of light stabilizers and the various types are described by way of example in A. Valet, Lichtschutzmittel für Lacke, Vincentz Verlag, Hanover, 1996.

Prior to combination/mixing, the streams may be conditioned by means of a heat exchanger, i.e. brought to a temperature of −20 to +200° C., preferably +10 to +140° C., more preferably +20 to +120° C. Subsequently they are mixed with an intensive mixer and conveyed through the reactor, which optionally contains further mixing elements. It is conceivable to connect two or more reactors in series. Each of these reactors is provided advantageously with cooling and/or heating means, as for example a jacket through which a conditioned heat transfer fluid is passed.

The use of an intensive mixer (p-mixer) produces very rapid mixing of the reaction solutions with one another, thus avoiding a possible radial concentration gradient. Advantageous in this context is the reduced shear of the reaction mixture in the case of the use of microreactors/micromixers, which, in the case of the shear-sensitive acrylates, results in a more reliable operating regime and, moreover, implies a heightened product quality.

The use of two or more independently conditionable heating/cooling zones makes it possible, for example, to cool the flowing reaction mixture at the beginning of the reaction, in other words shortly after mixing, and to take off heat of reaction that is liberated, and to heat the mixture towards the end of the reaction, in other words shortly before discharge from the reactor, in order to maximize conversion. The temperature of the cooling and heating media can be between +25 and +250° C., preferably below +200° C. As well as by heating and/or cooling, the temperature of the reaction mixture is also influenced by the heat of reaction. Where ethylenically unsaturated compounds are present it is appropriate not to exceed certain upper temperature limits, since otherwise the risk of unwanted polymerization goes up. For unsaturated acrylates the maximum reaction temperature ought not to exceed levels of +250° C. It is preferred not to exceed +200° C.

Figure 2:
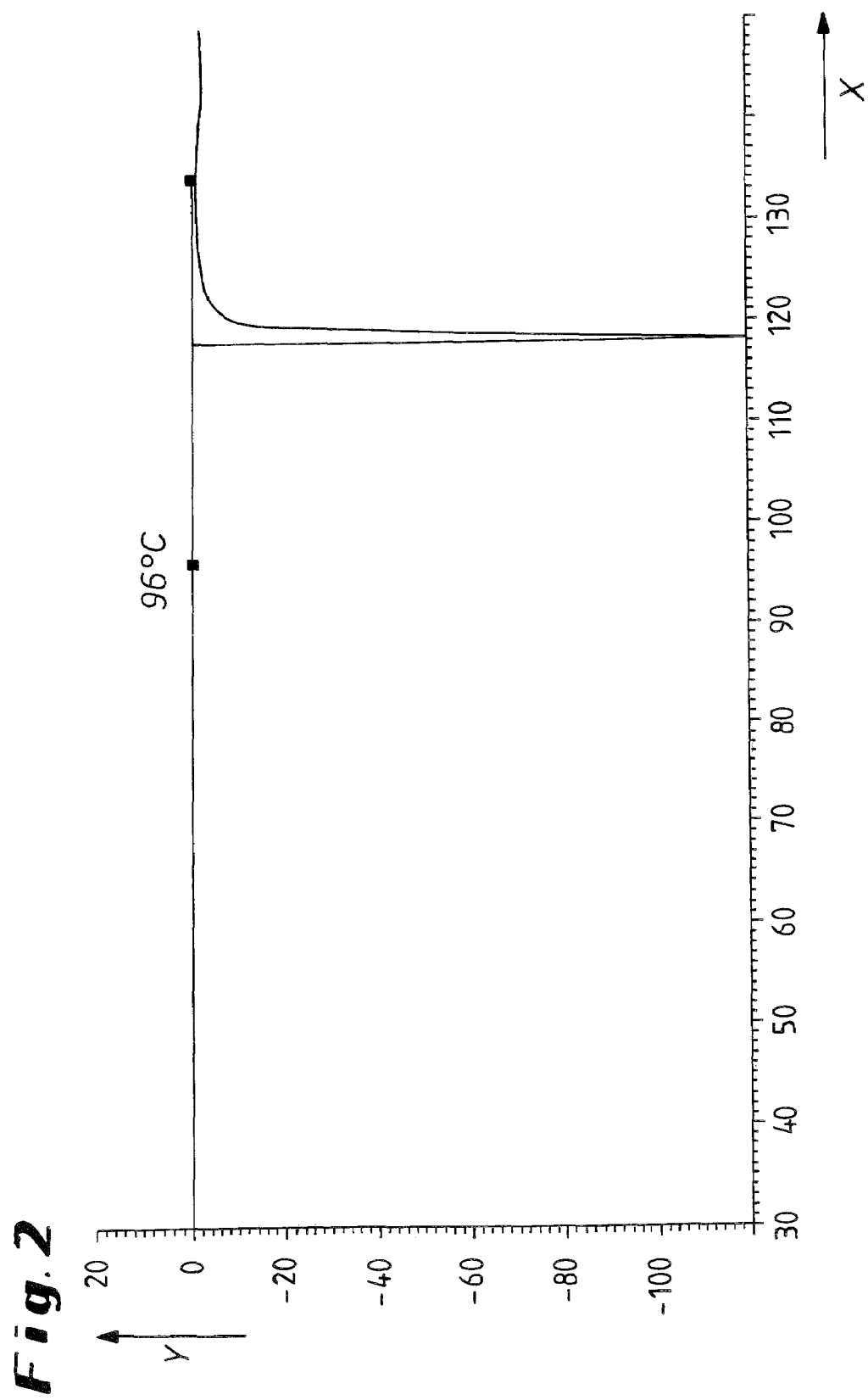
Figure 3:
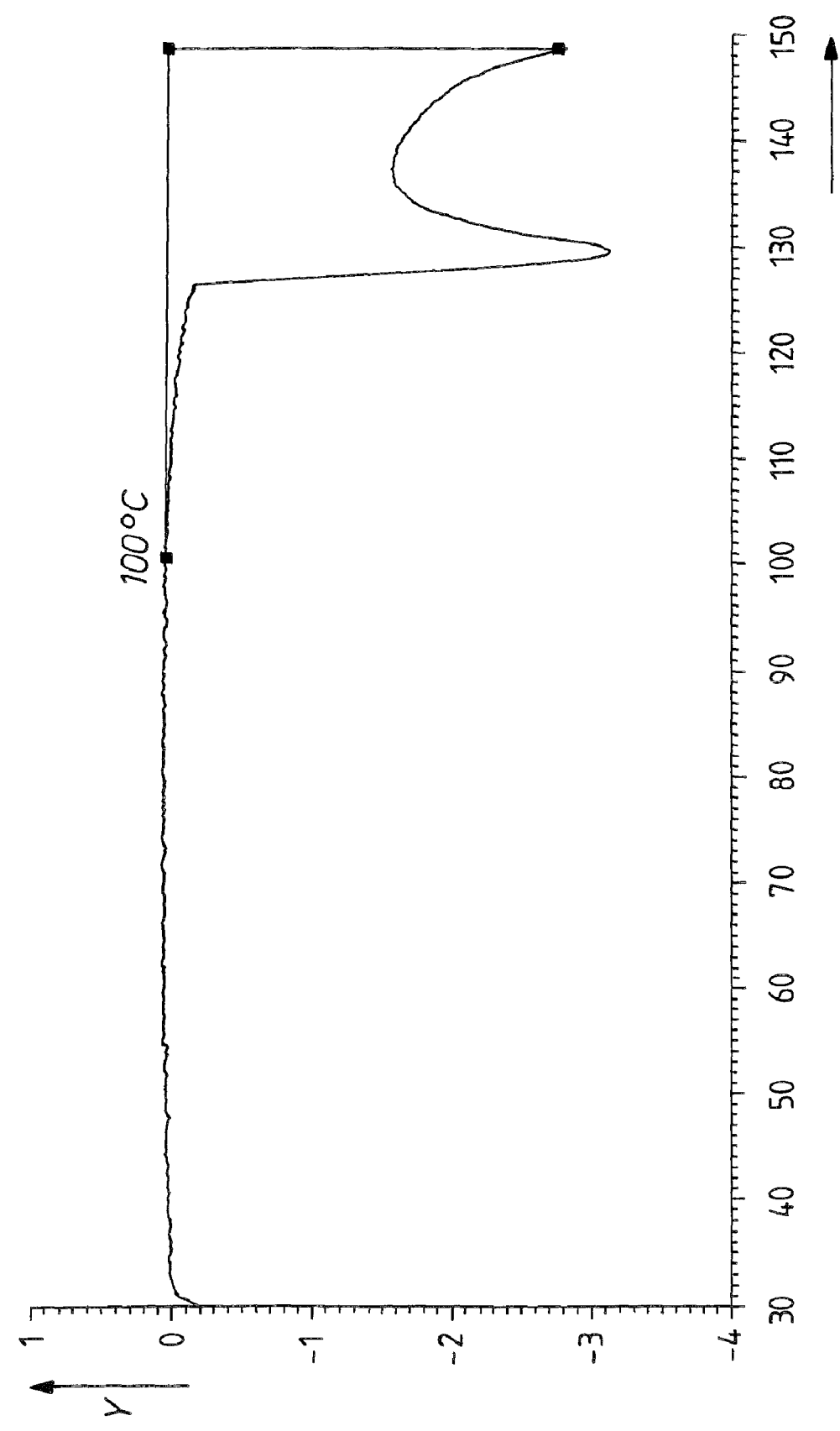

Surprisingly it has been found that the reaction for preparing radiation-curable prepolymers containing urethane groups can be carried out at reaction temperatures (Example 3) at which by means of DTA (differential thermoanalysis) there are already follow-on reactions and/or side reactions affecting the reaction components and/or products. For example, FIG. 3 shows the result of a differential thermoanalysis of the product (urethane acrylate) from Example 2 (semi-batch process). It can clearly be seen that there are follow-on reactions above just 100° C. FIG. 2 in turns shows the DTA of the reaction mixture introduced as an initial charge in the semi-batch process (Example 2). Here again, a distinct exotherm of the follow-on/side reaction is apparent above 110° C. It could therefore be supposed that these unwanted follow-on/side reactions might occur in a process with reaction temperatures above 100° C. Surprisingly, however, with the process of the invention, a product is obtained in high quality at a temperature of 110° C. (Example 3). In one particular embodiment of the process of the invention, the preparation of radiation-curable prepolymers containing urethane groups is carried out in a temperature range in which by means of DTA there are already first signs observable of a reaction in the case of one reactant or two or more individual reactants and/or in the case of one product or two or more individual products. This means that the temperature can be set as high as possible for the purpose of accelerating the process.

A surprising fact was that the reaction, which in the discontinuous process requires several hours, proceeds fully within a few minutes in the reactors stated. At the same time the products exhibit application properties which match or exceed those of the analogous products produced discontinuously in the batch process, so making it possible, with the process of the invention, to prepare the radiation-curable prepolymers containing urethane groups within a substantially shorter time and with comparable quality. In particular, the application of higher temperatures here leads to an acceleration of the reaction, without any of the feared follow-on and/or side reactions of the ethylenically unsaturated double bond.

Contrary to the expectations from the prior art, it has been found, surprisingly, that the process of the invention allows the preparation of radiation-curable prepolymers containing urethane groups which, with complete conversion of the compound(s) bearing isocyanate groups, exhibit a lower viscosity (Example 3) than the prepolymers prepared in a discontinuous process (Example 2).

A feature of the process of the invention is that a conversion of more than 99%, based on the compound with ethylenically unsaturated double bond, is achieved, this constituting a substantial advantage from a safety standpoint over the continuous processes known from the prior art.

Radiation-curable prepolymers containing urethane groups that can be prepared with the process of the invention are monomeric, oligomeric or polymeric compounds and also mixtures thereof which contain at least one urethane group and also possess at least one ethylenically unsaturated double bond, which permits further polymer construction and/or crosslinking by exposure to actinic radiation and/or thermally free-radically.

By actinic radiation is meant electromagnetic, ionizing radiation, more particularly UV rays, gamma rays, X-rays, visible light, infrared light, and also electron beams (Roche Lexikon Medizin, 4th edition; Urban & Fischer Verlag, Munich 1999).

Groups which react with ethylenically unsaturated compounds with polymerization on exposure to actinic radiation (radiation-curable groups) for the purposes of the present invention are, for example, vinyl ether, vinyl ester, maleinyl, fumaryl, maleinimide, dicyclopentadienyl, acrylamide, acrylic and methacrylic groups, and are preferably vinyl ether, acrylate and/or methacrylate groups, more preferably acrylate groups.

In the process of the invention at least one compound A which carries at least one isocyanate group per molecule is reacted with at least one compound B which carries at least one isocyanate-reactive group and also at least one ethylenically unsaturated double bond per molecule, and, optionally, with a compound C which carries isocyanate-reactive groups.

The compounds are combined in a mixer immediately prior to the reaction. The compounds A and B are fed separately in the form of at least two different components to a mixing element. These components may include further constituents such as solvents, reactive diluents, auxiliaries and/or catalysts. It is also possible to supply further components to the reaction mixture along the delay time section. In particular it is possible to supply one or more components which comprise one or more isocyanate-reactive compounds B or C, in order to reduce to a minimum the proportion of isocyanate groups in the end product.

Examples of compounds A are as follows: 3-methacryloylpropyl isocyanate, cyclohexyl isocyanate, n-butyl isocyanate, phenyl isocyanate, tolyl isocyanate, 1,4-tetramethylene diisocyanate, 1,6-hexamethylene diisocyanate (HDI), 1,8-octamethylene diisocyanate, 1,11-undecamethylene diisocyanate, 1,12-dodecamethylene diisocyanate, 2,2,4- and 2,4,4-trimethyl-1,6-hexamethylene diisocyanate (TMDI), 1,3- and 1,4-cyclohexane diisocyanate, 1-isocyanato-3-isocyanatomethyl-3,5,5-trimethylcyclohexane (IPDI), 1-isocyanato-1-methyl-4(3)-isocyanatomethylcyclohexane (IMCI), 1,4-phenylene diisocyanate, 1,5-naphthylene diisocyanate, 1-isocyanato-2-isocyanatomethylcyclopentane, (4,4'- and/or 2,4'-)diiso-cyanatodicyclohexylmethane (H12-MDI), xylylene diisocyanate (XDI), bis(4-isocyanato-3-methylcyclohexyl)methane, 1,3- and/or 1,4-hexahydroxylylene diisocyanate (H6-XDI), α,α,α',α'-tetramethyl-1,3- and/or -1,4-xylylene diisocyanate (TMXDI), 2,4- and/or 2,6-hexahydrotolylene diisocyanate (H6-TDI), 2,4- and/or 2,6-toluene diisocyanate (TDI), 4,4'- and/or 2,4'-diphenylmethane diisocyanate (MDI), or derivatives thereof with urethane, isocyanurate, allophanate, biuret, uretdione, carbodiimide, oxadiazinetrione and/or iminooxadiazinedione structural units, provided that they possess at least one free NCO group, and also mixtures thereof.

As compounds B it is possible to use all compounds which contain not only radiation-curable groups but also isocyanate-reactive groups. Preference is given here to using OH-functional esters of (meth)acrylic acid or OH-functional vinyl ethers. Examples of compounds B are as follows: 2-hydroxyethyl (meth)acrylate, polyethylene oxide mono(meth)acrylate (e.g. PEA6/PEM6; Laporte Performance Chemicals Ltd., UK), polypropylene oxide mono(meth)acrylate (e.g. PPA6, PPM5S; Laporte Performance Chemicals Ltd., UK), polyalkylene oxide mono(meth)acrylate (e.g. PEM63P, Laporte Performance Chemicals Ltd., UK), poly(ε-caprolactone) mono(meth)acrylates such as, for example Tone M100® (Dow, Schwalbach, Del.), 2-hydroxypropyl (meth)acrylate, 4-hydroxybutyl (meth)acrylate, hydroxybutyl vinyl ether, 3-hydroxy-2,2-dimethylpropyl (meth)acrylate, the hydroxy-functional mono-, di- or, where possible, higher acrylates such as, for example, glycerol di(meth)acrylate, trimethylolpropane di(meth)acrylate, pentaerythritol tri(meth)acrylate or dipentaerythritol penta(meth)acrylate, which are obtainable by reacting polyhydric, optionally alkoxylated alcohols such as trimethylolpropane, glycerol, pentaerythritol and dipentaerythritol.

As OH-functional compounds which contain radiation-curable groups it is also possible, furthermore, to use the reaction products of acids containing double bond with epoxide compounds optionally containing double bond, such as, for example, the reaction products of (meth)acrylic acid with glycidyl (meth)acrylate or bisphenol A diglycidyl ether, in the urethanization.

In the urethane formation procedure it is preferred to use hydroxyethyl (meth)acrylate, hydroxypropyl (meth)acrylate, hydroxybutyl (meth)acrylate, 3-acryloyloxy-2-hydroxypropyl methacrylate (GAMA) and alkoxylated polyols partly esterified with (meth)acrylic acid, very preferably hydroxyethyl acrylate and hydroxypropyl acrylate, and also alkoxylated polyols partly esterified with acrylic acid.

As well as the OH-functional unsaturated compounds of component B, it is also possible in the process of the invention to use compounds C which are non-reactive even on exposure to actinic radiation and which contain NCO-reactive groups such as OH, SH or NH, for example.

By way of example it is possible for low molecular weight alcohols, polyether polyols, polyester polyols and polycarbonate polyols to be used accompanyingly for the purpose of breaking down excess NCO groups or of influencing the product properties, as component C. As polyols it is possible to use both relatively high molecular weight and low molecular weight hydroxyl compounds.

Hydroxyl compounds of relatively high molecular weight encompass the hydroxy polyesters, hydroxy polyethers, hydroxy polythioethers, hydroxy polyacetals, hydroxy polycarbonates, dimer fatty alcohols and/or ester amides that are customary within polyurethane chemistry, in each case with average molecular weights of 400 to 8000 g/mol, preferably those having average molecular weights of 500 to 6500 g/mol. Preferred hydroxyl compounds of relatively high molecular weight are hydroxy polyethers, hydroxy polyesters and hydroxy polycarbonates.

Examples of low molecular weight polyols are as follows: monofunctional aliphatic, araliphatic and aromatic alcohols such as methanol, ethanol, n-propanol, isopropanol, butanol, hexanol, fatty alcohols, phenols, and also aliphatic, araliphatic and aromatic diols or polyols such as 1,2-ethanediol, 1,2- and 1,3-propanediol, the isomeric butanediols, neopentylglycol, 1,6-hexanediol, 2-methylpropane-1,3-diol, 2,2,4-trimethylpentane-1,3-diol, 2-n-butyl-2-ethylpropane-1,3-diol, glycerol monoalkanoates (such as, for example, the glycerol monostearates), dimer fatty alcohols, diethylene glycol, triethylene glycol, tetraethylene glycol, 1,4-dimethylolcyclohexane, dodecanediol, bisphenol A, hydrogenated bisphenol A, hexane-1,3-diol, octane-1,3-diol, decane-1,3-diol, 3-methylpentane-1,5-diol, 3,3-dimethylbutane-1,2-diol, 2-methylpentane-1,3-diol, 2-methylpentane-2,4-diol, 3-hydroxymethylheptan-4-ol, 2-hydroxymethyl-2,3-dimethylpentan-1-ol, glycerol, trimethylolethane, trimethylolpropane, trimer fatty alcohols, isomeric hexanetriols, sorbitol, pentaerythritol, ditrimethylolpropane, dipentaerythritol, diglycerol, tricyclodecanediol (TCD). Preference is given to 1,2-ethanediol, 1,2- and 1,3-propanediol, the isomeric butanediols, neopentylglycol, 1,6-hexanediol, 2-ethylhexane-1,3-diol, perhydrobisphenol, 4,8-bis(hydroxymethyl)tricyclo[5.2.0(2.6)]decane (TCD Alcohol).

Suitable polyether polyols are the polyethers that are customary in polyurethane chemistry, such as, for example, the addition compounds or mixed addition compounds of tetrahydrofuran, of styrene oxide, of ethylene oxide, of propylene oxide, of butylene oxides or of epichlorohydrin, particularly of ethylene oxide and/or of propylene oxide, that are prepared using divalent to hexavalent starter molecules such as water or the abovementioned polyols or amines having 1 to 4 NH bonds. Preference is given to propylene oxide polyethers which contain on average 2 to 4 hydroxyl groups and which may contain up to 50% by weight of incorporated polyethylene oxide units. It is conceivable to use not only conventional polyethers, prepared on the basis of catalysis with—for example—potassium hydroxide, but also those polyethers prepared by the more recent processes based on the double metal cyanide catalyst. Latter polyethers generally have a particularly low terminal unsaturation content of less than 0.07 meq/g, have a significantly lower monools content, and have generally a low polydispersity of less than 1.5. The use of polyethers of this kind prepared by double metal cyanide catalysis is preferred when polyethers are used.

Suitability as polyester polyols is possessed by, for example, reaction products of polyhydric, preferably dihydric and, where appropriate, additionally trihydric alcohols, with polybasic, preferably dibasic, carboxylic acids. In place of the free polycarboxylic acids it is also possible to use the corresponding polycarboxylic anhydrides or corresponding polycarboxylic esters of lower alcohols or mixtures thereof for preparing the polyesters. The polycarboxylic acids may be aliphatic, cycloaliphatic, aromatic and/or heterocyclic in nature and may where appropriate be substituted—by halogen atoms, for example—and/or unsaturated. Examples include adipic acid, phthalic acid, isophthalic acid, succinic acid, suberic acid, azelaic acid, sebacic acid, trimellitic acid, phthalic anhydride, tetrahydrophthalic anhydride, glutaric anhydride, tetrachlorophthalic anhydride, endomethylenetetrahydrophthalic anhydride, maleic anhydride, maleic acid, fumaric acid, dimeric and trimeric fatty acids such as oleic acid, where appropriate in a mixture with monomeric fatty acids, dimethyl terephthalate or bisglycol terephthalate. Preference is given to hydroxy polyesters which melt at below 60° C. and have 2 or 3 terminal OH groups.

The polycarbonate polyols that are contemplated are obtainable by reaction of carbonic acid derivatives, such as diphenyl carbonate, dimethyl carbonate or phosgene, with diols. Examples of suitable such diols include ethylene glycol, triethylene glycol, tetraethylene glycol, propane-1,2- and -1,3-diol, butane-1,4- and -1,3-diol, pentane-1,5-diol, hexane-1,6-diol, octane-1,8-diol, neopentyl glycol, 1,4-bis(hydroxymethyl)cyclohexane, bis(hydroxymethyl)tricyclo[5.2.1.0$^{2.6}$]decane or 1,4-bis(2-hydroxyethoxy)benzene, 2-methyl-1,3-propanediol, 2,2,4-trimethylpentanediol, dipropylene glycol, polypropylene glycol, dibutylene glycol, polybutylene glycol, bisphenol A and tetrabromobisphenol A or mixtures of the stated diols. The diol component preferably contains 40% to 100% by weight of hexanediol, preferably hexane-1,6-diol, and/or hexanediol derivatives, preferably those which as well as terminal OH groups contain ether groups or ester groups, examples being the products which have been obtained by reacting 1 mol of hexanediol with at least 1 mol, preferably 1 to 2 mol, of caprolactone in accordance with DE-A 1 770 245, or by etherification of hexanediol with itself to give the di- or trihexylene glycol. The preparation of such derivatives is known from DE-A 1 570 540, for example. The polyether-polycarbonate diols that are described in DE-A 3 717 060 can be used to very good effect as well.

The hydroxy polycarbonates ought to be substantially linear. However, they may also be slightly branched, where appropriate, as a result of the incorporation of polyfunctional components, more particularly low molecular weight polyols. Examples of compounds suitable for this purpose include trimethylolpropane, hexane-1,2,6-triol, glycerol, butane-1,4-triol, pentaerythritol, quinitol, mannitol, sorbitol, methylglycoside and 4,3,6-dianhydrohexitols.

The addition reaction of a compound bearing at least one isocyanate group with a compound bearing at least one hydroxyl group, leading to the formation of urethane groups, can be accelerated in conventional manner by means of suitable catalysts such as, for example, tin octoate, dibutyltin dilaurate or tertiary amines such as dimethylbenzylamine. Further catalysts are described in, for example, Houben-Weyl, Methoden der Organischen Chemie, Vol. XIV/2, Thieme-Verlag, Stuttgart 1963, p. 60f. and also Ullmanns Enzyklopadie der Technischen Chemie, 4th edn., Vol. 19 (1981), p. 306. In general such catalysts are used in an amount of 0.001% to 2.5% by weight, preferably of 0.005% to 1.5% by weight, based on the total amount of components A, B and C.

It is advantageous to protect component B and also its reaction products from premature and unwanted free-radical polymerization by adding suitable inhibitors and/or antioxidants such as, for example phenols such as, for example, 2,6-di-tert-butylphenols, and/or hydroquinones and/or hydroquinone monoalkyl ethers and/or nitrosamines and/or phenothiazines and/or phosphorous esters and/or stable N-oxyl radicals and/or other free-radical scavengers in amounts of in each case 0.0005% to 0.3% by weight, based on the total mass of component B. The addition of these auxiliaries may be made before, simultaneously with and/or after the reaction of component B.

Additionally it is possible for the prepolymer and/or one of components A, B and/or C to be admixed with the reactive diluents that are known to a person skilled in the art in the chemistry of radiation-curing binders (see "Chemistry & Technology of UV & EB Formulations for Coatings, Inks & Paints", Vol. 2, PKT Oldring (Ed.), SITA Technology, London, England, pp. 250-290, 1991). These reactive diluents generally possess no further functional groups besides the radiation-curable functionalities. It is possible, though, to use as well those compounds which also contain acid, epoxy, silyl, phosphine, phosphate, urea, isocyanurate, uretdione, biuret or other groups, particularly when this produces further advantageous effects such as, for example, improved adhesion in the coating operation. Examples of reactive diluents are (meth)acrylic acid and its esters, vinyl (meth)acrylate, allyl (meth)acrylate, trimethylolpropane triallyl ether, glycerol tri(meth)acrylate, trimethylolpropane tri(meth)acrylate, pentaerythritol tetra(meth)acrylate, and dipentaerythritol hexa(meth)acrylate, styrene, divinylbenzene, vinyltoluene, isobornyl (meth)acrylate, butoxyethyl (meth)acrylate, alkylene glycol di(meth)acrylates such as ethylene and propylene glycol di(meth)acrylates, polyalkylene glycol di(meth)acrylates such as polyethylene and polypropylene glycol di(meth)acrylates, di(meth)acrylates of simple diols such as, for example, butanediol di(meth)acrylate, hexanediol di(meth)acrylate, cyclohexanedimethanol di(meth)acrylate, dicyclopentyl (meth)acrylate. Preference is given to hexanediol diacrylate, isobornyl methacrylate, isodecyl methacrylate, tricyclodecanedimethylol dimethacrylate, tripropylene glycol diacrylate, and the (meth)acrylated products of optionally ethoxylated or propoxylated diols or polyols such as, for example, trimethylolpropane, pentaerythritol, bisphenol A or cyclohexanedimethanol. Mixtures of the aforementioned compounds can be used as well. Trimethylolpropane trimethacrylate and/or trimethylolpropane triacrylate are preferred. The proportion of reactive diluent is customarily below 60% by weight, based on the prepolymer; it is preferred to add less than 30% by weight, and with particular preference no reactive diluent is used.

In place of reactive diluents it is of course also possible to use solvents. Suitable solvents include inert solvents, such as acetone, methyl ethyl ketone, tetrahydrofuran, dichloromethane, toluene, $C_1$-$C_4$ alkyl esters of acetic acid such as ethyl acetate or butyl acetate or acrylate esters such as hexane-1,6-diol diacrylate.

Products obtainable via the process of the invention are likewise provided by the invention.

The prepolymers of the invention are suitable for coating substrates comprising wood, metal, plastic, glass, textiles, minerals, paper and/or already-coated substrates thereof, or substrates thereof which are composed of any desired combinations of the stated materials. Mention may be made here in particular of applications in the industrial coating of MDF boards, preassembled products of relatively high value which already contain temperature-sensitive assemblies such as electronic assemblies, for example, and also the coating of furniture, coils, articles of everyday life, car bodies and components mounted therein/thereon.

The prepolymers of the invention are suitable, furthermore, for preparing printing inks. These printing inks may be used, for example, in offset, flexographic, gravure or relief printing processes.

The prepolymers of the invention can also be used in combination with one another or together with other customary binders, such as, for example, with polyesters, polyacrylates, polyethers, polyamides, polycarbonates, which may also where appropriate contain unsaturated groups.

The prepolymers of the invention are also suitable as curing compounds in moulding, injection-moulding and pressure-casting processes.

The invention is illustrated below with reference to the examples, but without being restricted to the examples.

EXAMPLES

Example 1

Reactor Construction

FIG. 1 shows an example of a reactor construction with which the process of the invention can be carried out. From two reservoir vessels (1-1, 1-2), respectively containing at least one compound having isocyanate-reactive groups and at least one compound having isocyanate groups, the reactants are first fed to a first mixing element (1-3) at ambient temperature by means of pumps (not shown here). A first mixing element of this kind may be, for example, a p-structured cascade mixer from Ehrfeld Mikrotechnik BTS GmbH. Isocyanate-reactive and isocyanate-group-bearing compounds are kept in separate reservoir vessels. The reservoir vessels (1-1, 1-2) may contain further compounds such as, for example, catalysts, solvents, reactive diluents and/or auxiliaries. After intense mixing of the components, the stream is introduced into a first reaction zone (1-4). Here the stream is brought by heat exchanger (1-5) to a temperature $T_1$. The reaction mixture passes through a delay section, in which further mixing elements (1-8) are installed at certain intervals. These are mixing structures of the kind described in EP1284159. It is also possible here, alternatively, to use static mixing elements such as Kenics or SMX, for example. The temperature of the reaction mixture is held at the temperature $T_1$ by means of intense heat transfer.

After a defined delay section, the reaction medium is conveyed into a second reaction zone (1-6), where the temperature is $T_2$. The reaction mixture is admixed with a further component from a reservoir vessel (1-7), and there is intense commixing in a mixing element (1-8). The further component may comprise one or more further compounds having isocyanate-reactive groups or isocyanate groups. The further component may comprise auxiliaries and/or solvents.

In the second reaction zone the reaction mixture passes through a defined delay section consisting of heat transfer elements (1-5) and mixing elements (1-8), before leaving the reaction zone. The temperatures $T_1$ and $T_2$ and the delay time are set so as to maximize the conversion of the reaction components.

Example 2

Semi-Batch Process

A 1000 ml four-necked round-bottomed flask with reflux condenser, heating mantel, mechanical stirrer, air traversal (2 L/h), internal thermometer and dropping funnel was charged with 288.84 g of Desmodur® N3600 (Bayer MaterialScience AG, Leverkusen), 120 g of hexanediol diacrylate, 0.3 g of dibutyltin dilaurate (Desmorapid Z, Bayer MaterialScience AG, Leverkusen) and 0.6 g of 2,6-di-tert-butyl-4-methylphenol and this initial charge was heated to 50° C. Then first 61.69 g of 2-hydroxypropyl acrylate and then 128.57 g of hydroxyethyl acrylate were added dropwise at a rate such that the temperature of 60° C. was not exceeded. Stirring was continued until the NCO value had dropped below 0.1%. this gave a colourless resin having a residual NCO content of 0% and a viscosity of 12,500 mPas (23° C.).

The viscosity measurements were carried out with a plate/plate rotation viscometer, the RotoVisko 1 from Haake, Del., with a shear rate of 47.94 m/s in accordance with ISO/DIS 3219:1990.

Example 3

Continuous Process

A mixture I of 2-hydroxypropyl acrylate, hydroxyethyl acrylate and dibutyltin dilaurate, and a mixture II of Desmodur® N3600, hexanediol diacrylate and 2,6-di-tert-butyl-4-methylphenol, were each introduced, corresponding to the composition indicated below.

Mixture I

| 2-Hydroxypropyl acrylate | 67.47% by weight |
|---|---|
| Hydroxyethyl acrylate | 32.373% by weight |
| Dibutyltin dilaurate | 0.157% by weight |

Mixture II

| Desmodur ® N3600 | 29.348% by weight |
|---|---|
| Hexanediol diacrylate | 70.505% by weight |
| 2,6-Di-tert-butyl-4-methylphenol | 0.147% by weight |

Mixture I and mixture II were mixed continuously with the aid of pumps (in this case double-piston injection pumps) via a µ-structured cascade mixer from Ehrfeld Mikrotechnik BTS GmbH, and the resulting mixture was pumped into a first reaction section (see FIG. 1). Commixing took place at room temperature (25° C.).

Within the first reaction section (section 1) the reaction mixture passes through a delay section which is temperature-conditioned by immersion into a thermostating bath. This delay section consists in this case of a ⅛" capillary, in which static mixing elements (see EP1284159) are installed at regular intervals, and of a delay reactor having an internal diameter of 15 mm, which likewise contains static mixing elements. The delay time is in total 30 minutes and the reaction temperature is 110° C.

This gave a colourless resin having a residual NCO content of 0% and a viscosity of 10,000 mPas (23° C.).

The viscosity measurements were carried out with a plate/plate rotation viscometer, the RotoVisko 1 from Haake, Del., with a shear rate of 47.94 m/s in accordance with ISO/DIS 3219:1990.

FIGURES

FIG. 1 shows diagrammatically a reactor construction with which the process of the invention can be performed, consisting of three reservoir vessels (1-1, 1-2, 1-7), two reaction zones (1-4, 1-6 with the temperatures $T_1$ and $T_2$, a series of mixing elements (1-3, 1-8), and heat transfer elements (1-5).

FIG. 2 shows the result of a long-time DTA (DTA=differential thermoanalysis) on the initial charge used in Example 2. Plotted on the abscissa (X-axis) is the temperature in ° C., and on the ordinate (Y-axis) the heat flow in mW/g. Negative values on the Y-axis denote heat given off by the sample (exotherm); positive values on the Y-axis denote heat absorbed by the sample (endotherm). The measurement was carried out in accordance with ISO 17025. The heating rate in the present case was as follows: 0.05 K/min. At a temperature of about 116° C. there was a clearly recognizable exothermic reaction.

FIG. 3 shows the result of a long-time DTA (DTA=differential thermoanalysis) on the product recovered in Example 2. Plotted on the abscissa (X-axis) is the temperature in ° C., and on the ordinate (Y-axis) the heat flow in mW/g. Negative values on the Y-axis denote heat given off by the sample (exotherm); positive values on the Y-axis denote heat absorbed by the sample (endotherm). The measurement was carried out in accordance with ISO 17025. The heating rate in the present case was as follows: 0.05 K/min. Above a temperature of about 100° C. an increasing exothermic reaction is evident.

The invention claimed is:

1. Process for the continuous preparation of radiation-curable prepolymers containing urethane groups, comprising mixing at least two components and then passing the mixed components through a delay section, one of the at least two components comprising one or more compounds having at least one isocyanate group per molecule, and the other of the at least two components comprising one or more compounds having at least one isocyanate reactive group and at least one ethylenically unsaturated double bond per molecule, wherein the delay section has a heat transfer rate of 20-750 kW/(K·m$^3$), and the process is performed in a microreactor allowing for said heat transfer rate.

2. Process according to claim 1, carried out under pressure of 0-30 bar and at temperatures of +20 to +200° C.

3. Process according to claim 1, having a delay time in the delay section of from 20 sec to 120 min.

4. Process according to claim 1, wherein the delay section has a maximum pressure loss of 0 to 30 bar.

5. Process according to claim 1, wherein the delay section comprises mixing elements and the components are further mixed by said mixing elements as they pass through the delay section.

6. Process according to claim 1, optionally including the addition of one or more further components along the delay section said one or more further components optionally comprising one or more compounds selected from the group consisting of compounds bearing isocyanate groups, isocyanate-reactive compounds, solvents, catalysts, reactive diluents and auxiliaries.

7. Process according to claim 1, wherein the delay section is subdivided into two or more zones having different temperatures.

* * * * *